(12) United States Patent
Karaki

(10) Patent No.: US 11,122,623 B2
(45) Date of Patent: Sep. 14, 2021

(54) CONTROLLING AUL TRANSMISSIONS WHEN COEXISTING WITH SCHEDULED UES

(71) Applicant: TELEFONAKTIEBOLAGET L M ERICSSON (PUBL), Stockholm (SE)

(72) Inventor: Reem Karaki, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 489 days.

(21) Appl. No.: 16/099,829

(22) PCT Filed: Aug. 22, 2018

(86) PCT No.: PCT/IB2018/056373
§ 371 (c)(1),
(2) Date: Nov. 8, 2018

(87) PCT Pub. No.: WO2019/038701
PCT Pub. Date: Feb. 28, 2019

(65) Prior Publication Data
US 2021/0227581 A1 Jul. 22, 2021

Related U.S. Application Data

(60) Provisional application No. 62/548,801, filed on Aug. 22, 2017.

(51) Int. Cl.
*H04W 74/08* (2009.01)
*H04W 72/12* (2009.01)
*H04W 72/04* (2009.01)

(52) U.S. Cl.
CPC ..... *H04W 74/0816* (2013.01); *H04W 72/042* (2013.01); *H04W 72/1289* (2013.01)

(58) Field of Classification Search
CPC .......... H04W 74/0816; H04W 72/042; H04W 72/1289
(Continued)

(56) References Cited

U.S. PATENT DOCUMENTS

2017/0048880 A1* 2/2017 Anderson ......... H04W 72/1226
2018/0227936 A1* 8/2018 Yerramalli .......... H04L 27/2662
(Continued)

FOREIGN PATENT DOCUMENTS

| CN | 110214467 A | 9/2019 |
| KR | 20190112267 A | 10/2019 |
| WO | 2018143339 A1 | 8/2018 |

OTHER PUBLICATIONS

Ericsson. "on Channel Access for AUL." 3GPP TSG RAN WG1 #90bis, R1-1717122, Oct. 13, 2017.
(Continued)

*Primary Examiner* — Peter G Solinsky
(74) *Attorney, Agent, or Firm* — Withrow & Terranova, PLLC

(57) ABSTRACT

Systems and methods are disclosed herein for restricting autonomous uplink transmissions by a wireless device in a wireless communication system such that wireless devices performing autonomous uplink transmissions can coexist with wireless devices performing scheduled uplink transmissions in a cell requiring Listen-Before-Talk (LBT). In some embodiments, a method of operation of a wireless device in a wireless communication system comprises receiving, from a radio access node, an indication of which subframes belong to a same channel occupancy within a cell that requires LBT and restricting performance of autonomous uplink transmissions by the wireless device based on the indication of which subframes belong to the same channel occupancy. By restricting autonomous uplink trans- (Continued)

missions in this manner, the wireless device can coexist with scheduled wireless devices in the same cell.

20 Claims, 12 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2018/0359766 | A1* | 12/2018 | Shih | H04W 72/0413 |
| 2019/0335496 | A1* | 10/2019 | Li | H04W 72/14 |
| 2019/0364590 | A1* | 11/2019 | Sartori | H04W 72/14 |
| 2019/0394798 | A1 | 12/2019 | Tomeba et al. | |
| 2020/0037359 | A1* | 1/2020 | Wang | H04L 1/1896 |
| 2020/0177318 | A1* | 6/2020 | Belleschi | H04L 1/1883 |
| 2020/0235898 | A1* | 7/2020 | Loehr | H04W 16/14 |
| 2020/0383108 | A1* | 12/2020 | Lunttila | H04W 72/0446 |
| 2020/0383132 | A1* | 12/2020 | Yang | H04L 1/1819 |

OTHER PUBLICATIONS

Intel Corporation, "Consideration on channel access mechanism for autonomous uplink access." 3GPP TSG RAN WG1 #90 R1-1712480, Aug. 12, 2017.

3GPP TS 36.212, V14.1.1, 3rd Generation Partnership Project; Technical Specification Group Radio Access Network; Evolved Universal Terrestrial Radio Access (E-UTRA); Multiplexing and channel coding, Release 14, Jan. 2017.

Samsung, "Resource allocation for autonomous UL access", 3GPP TSG RAN WG1 Meeting #90, R1-1713522, Aug. 20, 2017.

Intel Corporation, "A framework to enable autonomous uplink access", 3GPP TSG RAN WG1 Meeting #90, R1-1712478, Aug. 20, 2017.

Nokia et al., "On channel access for autonomous UL access", 3GPP TSG-RAN WG1 Meeting #90, R1-1713861, Aug. 20, 2017.

Fujitsu, "R1-160490: Evaluation results for UL LBT and PUSCH Design," 3GPP TSG RAN WG1 Meeting #84, Feb. 15-19, 2016, St. Julian's, Malta, 9 pages.

Notice of Reasons for Refusal for Japanese Patent Application No. 2020-509045, dated Mar. 30, 2021, 60 pages.

International Search Report and Written Opinion for International Patent Application No. PCT/IB2018/056373, dated Nov. 22, 2018, 10 pages.

Author Unknown, "Technical Specification Group Radio Access Network; Evolved Universal Terrestrial Radio Access (E-UTRA); Physical channels and modulation (Release 14)," Technical Specification 36.211, Version 14.3.0, Jun. 2017, 3GPP Organizational Partners, 195 pages.

Author Unknown, "Technical Specification Group Radio Access Network; Evolved Universal Terrestrial Radio Access (E-UTRA); Physical layer procedures (Release 14)," Technical Specification 36.213, Version 14.3.0, Jun. 2017, 3GPP Organizational Partners, 460 pages.

Author Unknown, "Technical Specification Group Radio Access Network; Evolved Universal Terrestrial Radio Access (E-UTRA); Medium Access Control (MAC) protocol specification (Release 14)," Technical Specification 36.321, Version 14.3.0, Jun. 2017, 3GPP Organizational Partners, 107 pages.

* cited by examiner

CONTROLLING AUL TRANSMISSIONS WHEN COEXISTING WITH SCHEDULED UES

RELATED APPLICATIONS

This application is a national stage application of International Patent Application No. PCT/IB2018/056373, filed Aug. 22, 2018, which claims the benefit of provisional patent application Ser. No. 62/548,801, filed Aug. 22, 2017, the disclosures of which are hereby incorporated herein by reference in their entireties.

TECHNICAL FIELD

The disclosed subject matter relates generally to telecommunications. Certain embodiments relate more particularly to concepts such as License Assisted Access (LAA), Unscheduled Long Term Evolution (LTE) uplink transmissions, and LTE/Wi-Fi coexistence.

BACKGROUND

The Third Generation Partnership Project (3GPP) work on "License Assisted Access" (LAA) intends to allow Long Term Evolution (LTE) equipment to also operate in the unlicensed radio spectrum. Candidate bands for LTE operation in the unlicensed spectrum include 5 Gigahertz (GHz), 3.5 GHz, etc. The unlicensed spectrum is used as a complement to the licensed spectrum or allows completely stand-alone operation.

For the case of unlicensed spectrum used as a complement to the licensed spectrum, devices connect in the licensed spectrum to a Primary Cell (PCell) and use Carrier Aggregation (CA) to benefit from additional transmission capacity in the unlicensed spectrum using one or more Secondary Cells (SCells). The CA framework allows two or more carriers to be aggregated with the condition that at least one carrier (or frequency channel) is in the licensed spectrum and at least one carrier is in the unlicensed spectrum. In the standalone mode of operation (i.e., operation completely in unlicensed spectrum), one or more carriers are selected solely in the unlicensed spectrum.

Regulatory requirements, however, may not permit transmissions in the unlicensed spectrum without prior channel sensing, transmission power limitations, or imposed maximum channel occupancy time. Since the unlicensed spectrum must be shared with other radios of similar or dissimilar wireless technologies, a so called Listen-Before-Talk (LBT) scheme needs to be applied. LBT involves sensing the medium for a predefined minimum amount of time and backing off if the channel is busy. Due to the centralized coordination and dependency of terminal devices on the base station (e.g., the Evolved or Enhanced Node B (eNB)) for channel access in LTE operation and imposed LBT regulations, LTE Uplink (UL) performance is especially hampered. UL transmission is becoming more and more important with user-centric applications and the need for pushing data to cloud.

Today, the unlicensed 5 GHz spectrum is mainly used by equipment implementing the IEEE 802.11 Wireless Local Area Network (WLAN) standard. This standard is known under its marketing brand "Wi-Fi" and allows completely standalone operation in the unlicensed spectrum. Unlike the case in LTE, Wi-Fi terminals can asynchronously access the medium and thus show better UL performance characteristics especially in congested network conditions.

Long Term Evolution (LTE)

LTE uses Orthogonal Frequency Division Multiplexing (OFDM) in the Downlink (DL) and Discrete Fourier Transform (DFT)-spread OFDM (also referred to as Single Carrier Frequency Division Multiple Access (SC-FDMA)) in the UL. The basic LTE downlink physical resource can thus be seen as a time-frequency grid as illustrated in FIG. 1 where each resource element corresponds to one OFDM subcarrier during one OFDM symbol interval. The UL subframe has the same subcarrier spacing as the DL and the same number of SC-FDMA symbols in the time domain as OFDM symbols in the DL.

In the time domain, LTE downlink transmissions are organized into radio frames of 10 milliseconds (ms), each radio frame consisting of ten equally-sized subframes of length Tsubframe=1 ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 Microseconds (μs).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

DL transmissions are dynamically scheduled, i.e., in each subframe the base station transmits control information about which terminals data is transmitted to and upon which resource blocks the data is transmitted, in the current DL subframe. This control signaling is typically transmitted in the first 1, 2, 3, or 4 OFDM symbols in each subframe and the number n=1, 2, 3, or 4 is known as the Control Format Indicator (CFI). The DL subframe also contains common reference symbols, which are known to the receiver and used for coherent demodulation of, e.g., the control information. A DL system with CFI=3 OFDM symbols as control is illustrated in FIG. 3. The reference symbols shown in FIG. 3 are the Cell Specific Reference Symbols (CRSs) and are used to support multiple functions including fine time and frequency synchronization and channel estimation for certain transmission modes.

UL transmissions are dynamically scheduled, i.e., in each DL subframe the base station transmits control information about which terminals should transmit data to the eNB in subsequent subframes, and upon which resource blocks the data is transmitted. The UL resource grid is comprised of data and UL control information in the Physical Uplink Shared Channel (PUSCH), UL control information in the Physical Uplink Control Channel (PUCCH), and various reference signals such as Demodulation Reference Signals (DMRSs) and Sounding Reference Signals (SRSs). DMRSs are used for coherent demodulation of PUSCH and PUCCH data, whereas SRS is not associated with any data or control information but is generally used to estimate the UL channel quality for purposes of frequency-selective scheduling. An example UL subframe is shown in FIG. 4. Note that UL DMRS and SRS are time-multiplexed into the UL subframe, and SRSs are always transmitted in the last symbol of a normal UL subframe. The PUSCH DMRS is transmitted once every slot for subframes with normal cyclic prefixes, and is located in the fourth and eleventh SC-FDMA symbols.

From LTE Release (Rel) 11 onwards, DL or UL resource assignments can also be scheduled on the enhanced Physical Downlink Control Channel (EPDCCH). For Rel-8 to Rel-10 only the Physical Downlink Control Channel (PDCCH) is available. Resource grants are User Equipment device (UE) specific and are indicated by scrambling the Downlink Control Information (DCI) Cyclic Redundancy Check (CRC) with the UE-specific Cell Radio Network Temporary Identifier (C-RNTI) identifier. A unique C-RNTI is assigned by a cell to every UE associated with it, and can take values in the range 0001-FFF3 in hexadecimal format. A UE uses the same C-RNTI on all serving cells.

Scheduled LTE UL Scheme

In LTE the UL access is typically controlled by the eNB, i.e., scheduled. In this case the UE would report to the eNB when data is available to be transmitted, e.g., by sending a Scheduling Request (SR) message. Based on this, the eNB would grant the resources and relevant information to the UE in order to carry out the transmission of a certain size of data. The assigned resources are not necessarily sufficient for the UE to transmit all the available data. Therefore, it is possible that the UE sends a Buffer Status Report (BSR) control message in the granted resources in order to inform the eNB about the correct size and updated size of the data waiting for transmission. Based on that, the eNB would further grant the resources to carry on with the UE UL transmission of the corrected size of data.

In more detail, every time new data arrives at the UE's empty buffer, the following procedure should be performed:
1. Using PUCCH, the UE informs the network that it needs to transmit data by sending a SR indicating that it needs UL access. The UE has periodic timeslots for SR transmissions (typically on a 5, 10, or 20 ms interval).
2. Once the eNB receives the SR request bit, it responds with a small "UL grant" that is just large enough to communicate the size of the pending buffer. The reaction to this request typically takes 3 ms.
3. After the UE receives and processes (takes about 3 ms) its first UL grant, it typically sends a BSR that is a Medium Access Control (MAC) Control Element (CE) used to provide information about the amount of pending data in the UL buffer of the UE. If the grant is big enough, the UE sends data from its buffer within this transmission as well. Whether the BSR is sent depends also on conditions specified in 3GPP Technical Specification (TS) 36.321.
4. The eNB receives the BSR message, allocates the necessary UL resources, and sends back another UL grant that will allow the device to drain its buffer.

Adding it all up, about 16 ms (plus the time to wait for a PUCCH transmission opportunity) of delay can be expected between data arrival at the empty buffer in the UE and reception of this data in the eNB.

In case the UE is not Radio Resource Control (RRC) connected in LTE or lost its UL synchronization since it did not transmit or receive anything for a certain time, the UE would use the random access procedure to connect to the network, obtain synchronization, and also send the SR. If this is the case, the procedure until the data can be sent would take even longer than the SR transmission on PUCCH.

DCI for Scheduling LTE UL Transmission

In the LTE system, the transmission formats and parameters are controlled by the eNB. Such DCI typically contains:
  resources allocated for UL transmission (including whether frequency hopping is applied),
  modulation and coding scheme,
  redundancy versions,
  new data indicator,
  transmit power control command,
  information about DMRS,
  in case of cross-carrier scheduling, the target carrier index, and
  other applicable control information on UL transmissions.

The DCI is first protected by 16-bit CRC. The CRC bits are further scrambled by the UE assigned identity (i.e., the C-RNTI). The DCI and scrambled CRC bits are further protected by convolutional coding. The encoded bits are transmitted from the eNB to the UE using either PDCCH or EPDCCH.

WLAN

In typical deployments of WLAN, Carrier Sense Multiple Access with Collision Avoidance (CSMA/CA) is used for medium access. This means that the channel is sensed to perform a Clear Channel Assessment (CCA), and a transmission is initiated only if the channel is declared as Idle. In case the channel is declared as Busy, the transmission is essentially deferred until the channel is deemed to be Idle.

A general illustration of the LBT mechanism of Wi-Fi is shown in FIG. 5. After a Wi-Fi station A transmits a data frame to a station B, station B shall transmit the Acknowledgement (ACK) frame back to station A with a delay of 16 µs. Such an ACK frame is transmitted by station B without performing a LBT operation. To prevent another station interfering with such an ACK frame transmission, a station shall defer for a duration of 34 µs (referred to as Distributed Inter-Frame Space (DIFS)) after the channel is observed to be occupied before assessing again whether the channel is occupied. Therefore, a station that wishes to transmit first performs a CCA by sensing the medium for a fixed duration DIFS. If the medium is idle then the station assumes that it may take ownership of the medium and begin a frame exchange sequence. If the medium is busy, the station waits for the medium to go idle, defers for DIFS, and waits for a further random backoff period.

In the above basic protocol, when the medium becomes available, multiple Wi-Fi stations may be ready to transmit, which can result in collision. To reduce collisions, stations intending to transmit select a random backoff counter and defer for that number of slot channel idle times. The random backoff counter is selected as a random integer drawn from a uniform distribution over the interval of [0, CW]. The default size of the random backoff Contention Window (CW), CWmin, is set in the IEEE specs. Note that collisions can still happen even under this random backoff protocol when there are many stations contending for the channel access. Hence, to avoid recurring collisions, the backoff CW size CW is doubled whenever the station detects a collision of its transmission up to a limit, CWmax, also set in the IEEE specs. When a station succeeds in a transmission without collision, it resets its random backoff CW size back to the default value, CWmin.

LAA to Unlicensed Spectrum Using LTE

Up to now, the spectrum used by LTE is dedicated to LTE. This has the advantage that LTE system does not need to care about the coexistence issue and the spectrum efficiency can be maximized. However, the spectrum allocated to LTE is limited which cannot meet the ever increasing demand for larger throughput from applications/services. Therefore, Rel-13 LAA extended LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. That is, as shown in FIG. 6, a UE is connected to a PCell in the licensed band and one or more SCells in the unlicensed band. A SCell in unlicensed spectrum is referred to herein as a LAA SCell. In the case of standalone operation as in MulteFire, no licensed cell is available for UL control signal transmissions.

Maximum Channel Occupancy Time

LAA UL transmissions are scheduled by the eNB to occur at specific time-frequency resources. In the case of self-scheduling, UL transmissions cannot continuously access the channel. Furthermore, LAA UL with self-scheduling requires two successful LBT procedures for the LAA UL data transmission to occur: one successful LBT at the eNB for the UL grant transmission and another successful LBT at the UE for data transmission.

These drawbacks were accounted for when designing the UL LBT. To ensure that UL LAA transmissions do not suffer from degradation in channel access due to long and multiple sensing durations, the shared Maximum Channel Occupancy Time (MCOT) concept was adopted. The MCOT defines the maximum time allowed to share the channel among an access point and its served nodes, and is specified in certain regional spectrum regulations. Shared MCOT is applicable to Wi-Fi and also adopted by LAA.

FIG. 7 shows an example. When a node, referred to as initiating node (i.e., an eNB in case of LAA), initiates a channel occupancy by performing an exponential random back-off which is also known as Cat. 4 LBT, it is allowed to share its channel occupancy with other nodes, referred to as responding nodes (i.e., UEs in case of LAA).

Gaps between transmissions of different nodes are allowed. Any gap between two transmissions that is larger than 25 μs shall not be counted towards the MCOT limit unless the gap is between non-consecutive DL transmissions. Only in the latter case, the gap is counted towards the MCOT limit. After a gap, an LBT based on a CCA of at least 25 μs (Cat. 4 is not precluded) is required prior to transmission. Most importantly, the rules require that the total channel occupancy by the initiating and responding nodes, i.e. DL and UL transmissions in case of LAA, shall not exceed the MCOT corresponding to the LBT priority class that is used by the eNB to access the channel.

Shared MCOT between the eNB and its UEs reduces the occurrence of situations where two exponential back-offs are needed before an UL transmission can happen. In this case, an eNB can initiate the transmit opportunity with the grant transmission based on any of the Rel-13 Cat. 4 LBT priority classes and UEs can benefit from using faster LBT as long as their transmission falls within the same MCOT. This will help increase the chances for the LAA UEs to access the channel.

Since the eNB initiates the channel occupancy after performing a successful Cat. 4 LBT, the eNB has to ensure that the corresponding UL transmission based on a 25 μs LBT or UL LBT Type 2 fall within the MCOT limit. Therefore, when the eNB signals to the UE the LBT type via the UL grant, if the scheduled UL transmissions fall within the MCOT limit acquired by the eNB, the eNB signals the UL LBT Type 2, i.e. UL LBT based on 25 μs CCA for accessing the channel at the UE for transmission of the scheduled subframes.

Moreover, the UE can modify a Type 1 UL LBT to a Type 2 UL LBT in the following case. In LAA, the UE may receive Common PDCCH (C-PDCCH) where the eNB indicates to the UE which UL subframes belong to the same channel occupancy by sending the following information on C-PDCCH using 5 bits:

UL burst duration (L): The UL burst duration (L) is the number of consecutive UL subframes belonging to the same channel occupancy, with the DL subframes in the same channel occupancy signaling the UL burst duration.

Offset (O): The offset (O) is the number of subframes to the start of the indicated UL burst from the start of the subframe carrying the C-PDCCH.

The LBT procedure for any UL subframe from the subframe in which C-PDCCH was received up to and including all subframes until the end of the signaled UL burst duration, for which the eNB had already indicated to perform Cat. 4 LBT, can be switched to UL LBT Type 2 or an LBT based on 25 μs CCA.

Unscheduled UL for LAA/MulteFire

For the LTE UL channel access, both the UE and eNB need to perform LBT operations corresponding to the SR, scheduling grant, and data transmission phases. In contrast, Wi-Fi terminals only need to perform LBT once in the UL data transmission phase. Moreover, Wi-Fi terminals can asynchronously send data compared to the synchronized LTE system. Thus, Wi-Fi terminals have a natural advantage over LTE terminals in UL data transmission, and show superior performance in collocated deployment scenarios as seen in our simulation studies. Overall study results show that Wi-Fi has a better UL performance than LTE particularly in low-load or less congested network conditions. As the network congestion or load is increased, the LTE channel access mechanism (Time Division Multiple Access (TDMA) type) becomes more efficient, but Wi-Fi UL performance is still superior.

Both MulteFire and 3GPP are discussing the support of unscheduled UL, which is also known as autonomous UL or grant-less UL on unlicensed cells. This way, the UE can autonomously transmit the PUSCH without a dynamic UL grant and therefore UL latency can be lower by reducing the control signaling related to scheduling that precede every UL transmission. It has been shown that autonomous UL LAA performs significantly better than scheduled UL at low load due to the reduced signaling overhead. In addition, it coexists fairly with coexisting Wi-Fi network.

SUMMARY

Systems and methods are disclosed herein for restricting autonomous uplink transmissions by a wireless device in a wireless communication system such that wireless devices performing autonomous uplink transmissions can coexist with wireless devices performing scheduled uplink transmissions in a cell requiring Listen-Before-Talk (LBT). In some embodiments, a method of operation of a wireless device in a wireless communication system comprises receiving, from a radio access node, an indication of which subframes belong to a same channel occupancy within a cell that requires LBT and restricting performance of autonomous uplink transmissions by the wireless device based on the indication of which subframes belong to the same channel occupancy. By restricting autonomous uplink transmissions in this manner, the wireless device can coexist with scheduled wireless devices in the same cell.

In some embodiments, the method further comprises receiving, from the radio access node, an indication of whether the wireless device is allowed to perform autonomous uplink transmissions during any of the subframes that belong to the same channel occupancy or during a subset of the subframes that belong to the same channel occupancy. Restricting performance of autonomous uplink transmissions comprises restricting performance of autonomous uplink transmissions by the wireless device based on the indication of which subframes belong to the same channel occupancy and whether the wireless device is allowed to perform autonomous uplink transmissions during any of the subframes that belong to the same channel occupancy or a subset of the subframes that belong to the same channel occupancy.

In some embodiments, receiving the indication comprises receiving a Common Physical Downlink Control Channel (C-PDCCH) that comprises the indication, wherein the indication comprises an indication of a scheduled uplink burst duration. The method further comprises receiving, from the radio access node, an indication of whether the wireless device is allowed to perform autonomous uplink transmissions during any subframe or a subset of the subframes from a subframe in which the C-PDCCH was received up to and including all subframes until an end of the scheduled uplink burst duration. Restricting the performance of autonomous uplink transmissions by the wireless device comprises avoiding autonomous uplink transmissions by the wireless device in accordance with the indication of whether the wireless device is allowed to perform autonomous uplink transmissions during any subframe or a subset of the subframes from the subframe in which the C-PDCCH was received up to and including all subframes until an end of the scheduled uplink burst duration. Further, in some embodiments, the indication of whether the wireless device is allowed to perform autonomous uplink transmissions during any subframe or a subset of the subframes from a subframe in which the C-PDCCH was received up to and including all subframes until an end of the scheduled uplink burst duration is comprised in the C-PDCCH. In some other embodiments, the indication of whether the wireless device is allowed to perform autonomous uplink transmissions during any subframe or a subset of the subframes from a subframe in which the C-PDCCH was received up to and including all subframes until an end of the scheduled uplink burst duration is a 1 bit indication comprised in the C-PDCCH.

In some embodiments, restricting the performance of autonomous uplink transmissions by the wireless device comprises avoiding autonomous uplink transmissions by the wireless device from a subframe in which the indication was received up until an end of the channel occupancy.

In some embodiments, receiving the indication comprises receiving a C-PDCCH that comprises the indication, wherein the indication comprises an indication of an uplink burst duration. Restricting the performance of autonomous uplink transmissions by the wireless device comprises avoiding autonomous uplink transmissions by the wireless device from a subframe in which the C-PDCCH was received up until an end of the uplink burst duration.

In some embodiments, receiving the indication comprises receiving the indication in a subframe n and an indication of an offset of a start of the channel occupancy from the subframe n, and restricting the performance of autonomous uplink transmissions by the wireless device comprises avoiding autonomous uplink transmissions by the wireless device from a subframe n+Offset−X up until an end of the channel occupancy, wherein "Offset" is the offset of the start of the channel occupancy from the subframe n and "X" is predefined or preconfigured value that is less than or equal to the offset.

In some embodiments, receiving the indication comprises receiving, in a subframe n, a C-PDCCH that comprises the indication, wherein the indication is an indication of an uplink burst duration, and an indication of an offset of a start of the uplink burst duration from the subframe n. Restricting the performance of autonomous uplink transmissions by the wireless device comprises avoiding autonomous uplink transmissions by the wireless device from a subframe n+Offset−X up until an end of the uplink burst duration, wherein "Offset" is the offset of the start of the uplink burst duration from the subframe n and "X" is predefined or preconfigured value that is less than or equal to the offset.

In some embodiments, restricting the performance of autonomous uplink transmissions by the wireless device comprises allowing autonomous uplink transmissions by the wireless device in any subframe from a subframe in which the indication was received up until an end of the channel occupancy if the autonomous uplink transmission is limited to single subframe transmissions and the autonomous uplink transmission leaves a last symbol of the autonomous uplink transmission vacated.

In some embodiments, receiving the indication comprises receiving, in a subframe n, a C-PDCCH that comprises the indication, wherein the indication is an indication of an uplink burst duration, and restricting the performance of autonomous uplink transmissions by the wireless device comprises allowing autonomous uplink transmissions by the wireless device in any subframe from the subframe n in which the C-PDCCH was received up until an end of the uplink burst duration if the autonomous uplink transmission is limited to single subframe transmissions and the autonomous uplink transmission leaves a last symbol of the autonomous uplink transmission vacated.

In some embodiments, the method further comprises receiving one or more autonomous uplink restrictions from the radio access node, and restricting the performance of autonomous uplink transmissions by the wireless device comprises restricting the performance of autonomous uplink transmissions by the wireless device in accordance with the one or more autonomous uplink restrictions.

Embodiments of a wireless device for a wireless communication system are also disclosed. In some embodiments, a wireless device for a wireless communication system is adapted to receive, from a radio access node, an indication of which subframes belong to a same channel occupancy within a cell that requires LBT and restrict performance of autonomous uplink transmissions by the wireless device based on the indication of which subframes belong to the same channel occupancy.

In some embodiments, a wireless device for a wireless communication system comprises one or more transceivers and circuitry whereby the wireless device is operable to receive, from a radio access node via the one or more transceivers, an indication of which subframes belong to a same channel occupancy within a cell that requires LBT and restrict performance of autonomous uplink transmissions by the wireless device based on the indication of which subframes belong to the same channel occupancy.

Embodiments of a method of operation of a radio access node in a wireless communication system are also disclosed. In some embodiments, a method of operation of a radio access node in a wireless communication system comprises sending, to a wireless device, an indication of which subframes belong to a same channel occupancy within a cell that requires LBT and sending, to the wireless device, an indication of whether the wireless device is allowed to perform autonomous uplink transmissions during any of the subframes that belong to the same channel occupancy or during a subset of the subframes that belong to the same channel occupancy.

In some embodiments, sending the indication comprises sending a C-PDCCH that comprises the indication, wherein the indication comprises an indication of a scheduled uplink burst duration. The indication of whether the wireless device is allowed to perform autonomous uplink transmissions during any of the subframes that belong to the same channel occupancy or during a subset of the subframes that belong to the same channel occupancy is an indication of whether the wireless device is allowed to perform autonomous uplink transmissions during any subframe or a subset of the subframes from a subframe in which the C-PDCCH was received up to and including all subframes until an end of the scheduled uplink burst duration. In some embodiments, the indication of whether the wireless device is allowed to perform autonomous uplink transmissions during any subframe or a subset of the subframes from a subframe in which the C-PDCCH was received up to and including all subframes until an end of the scheduled uplink burst duration is comprised in the C-PDCCH. In some other embodiments, the indication of whether the wireless device is allowed to perform autonomous uplink transmissions during any subframe or a subset of the subframes from a subframe in which the C-PDCCH was received up to and including all subframes until an end of the scheduled uplink burst duration is a 1 bit indication comprised in the C-PDCCH.

Embodiments of a radio access node for a wireless communication system are also disclosed. In some embodiments, a radio access node for a wireless communication system is adapted to send, to a wireless device, an indication of which subframes belong to a same channel occupancy within a cell that requires LBT and send, to the wireless device, an indication of whether the wireless device is allowed to perform autonomous uplink transmissions during any of the subframes that belong to the same channel occupancy or during a subset of the subframes that belong to the same channel occupancy.

In some embodiments, a radio access node for a wireless communication system comprises one or more processors and memory storing instructions executable by the one or more processors whereby the radio access node is operable to send, to a wireless device, an indication of which subframes belong to a same channel occupancy within a cell that requires LBT and send, to the wireless device, an indication of whether the wireless device is allowed to perform autonomous uplink transmissions during any of the subframes that belong to the same channel occupancy or during a subset of the subframes that belong to the same channel occupancy.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Maximum Channel Occupancy Time (MCOT) sharing is one of the main features to enhance the performance of scheduled Uplink (UL) on unlicensed bands. Using this concept, the scheduled UL can start after a 25 microsecond (μs) LBT instead of a Cat. 4 exponential backoff.

Figure 1:
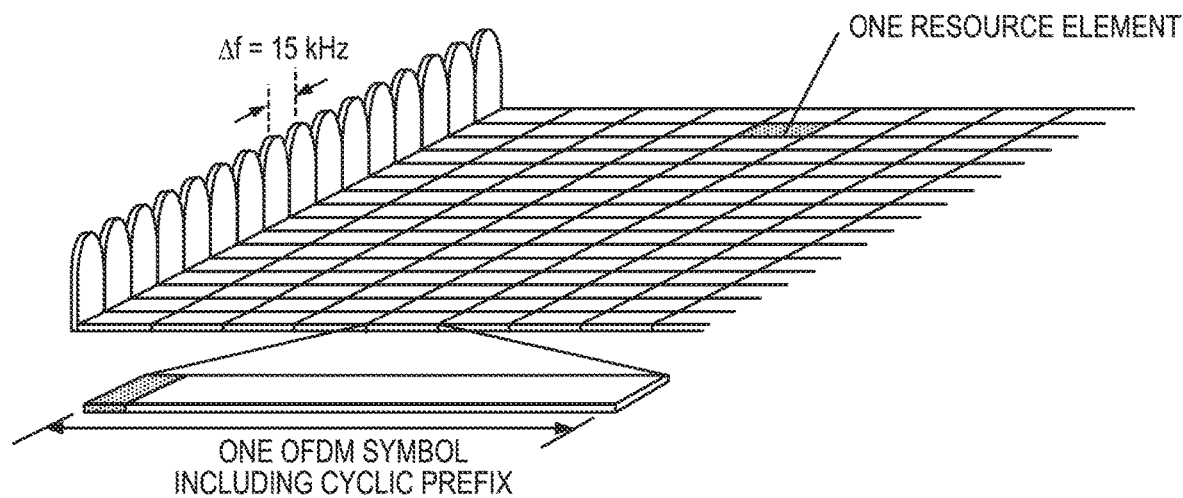
FIG. 1 illustrates the Long Term Evolution (LTE) downlink physical resource.
Figure 2:
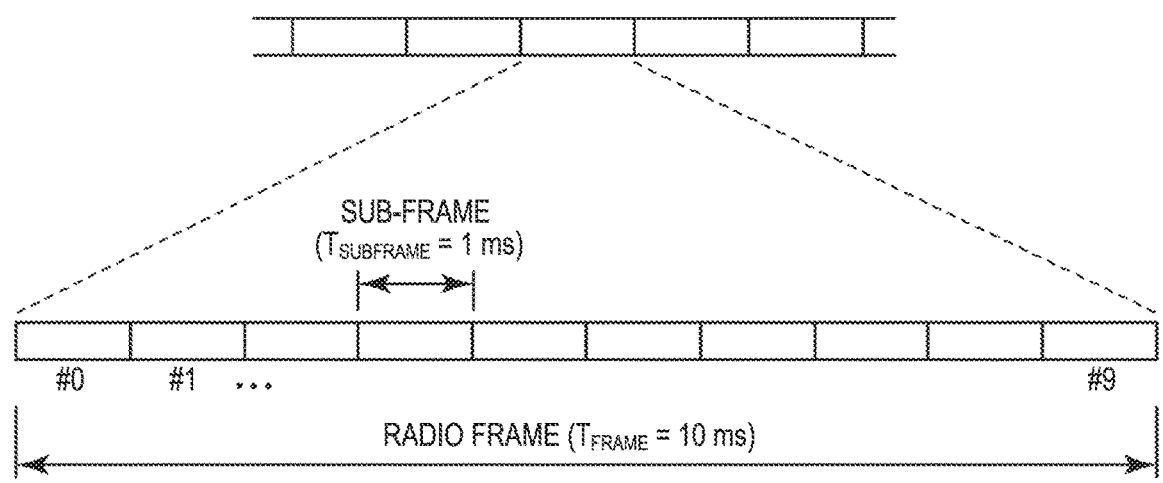
FIG. 2 illustrates the LTE time-domain structure.
Figure 3:
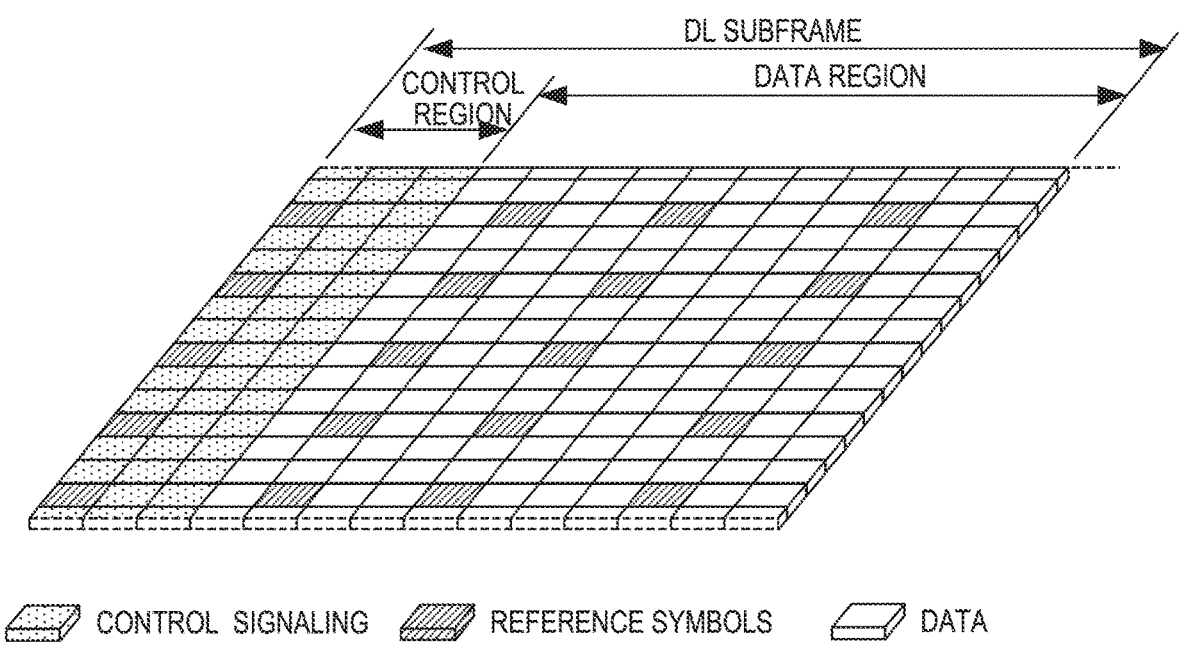
FIG. 3 illustrates an LTE Downlink (DL) subframe.
Figure 4:
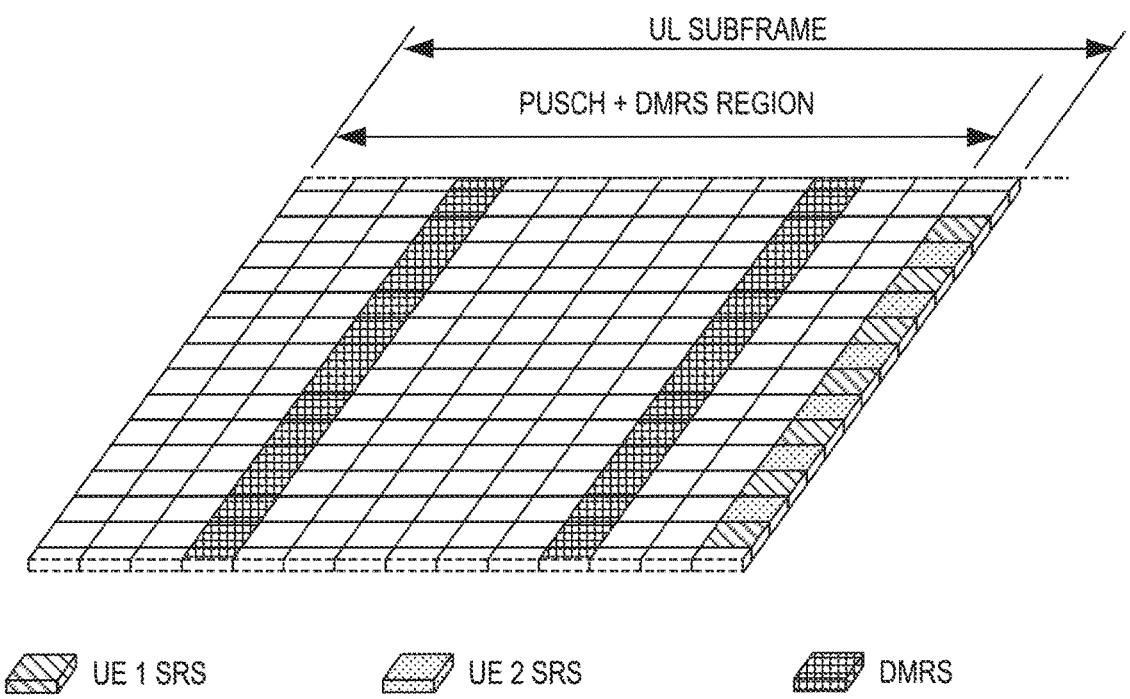
FIG. 4 illustrates an LTE Uplink (UL) subframe.
Figure 5:
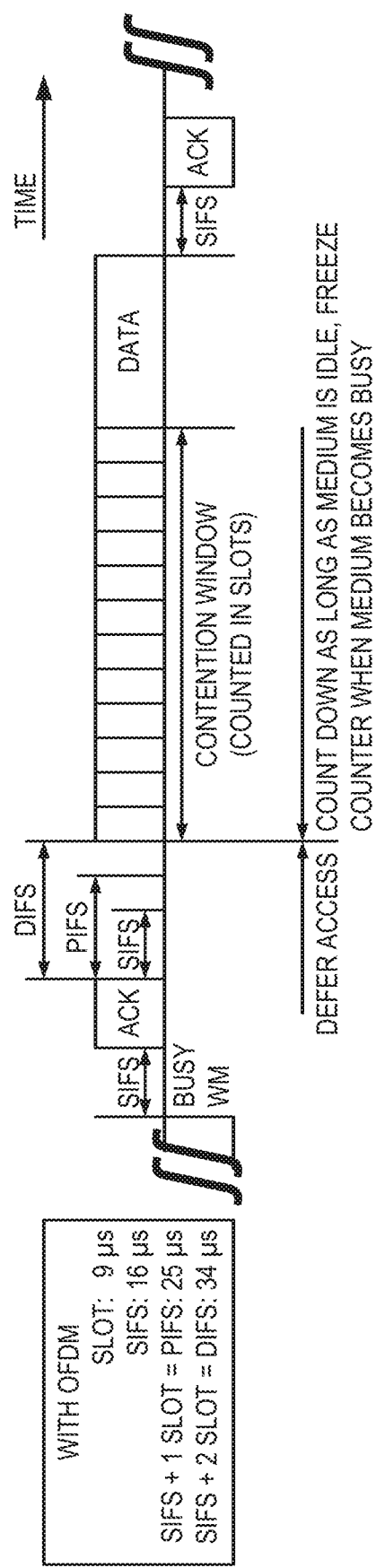
FIG. 5 is an illustration of Listen-Before-Talk (LBT) in Wi-Fi.
Figure 6:
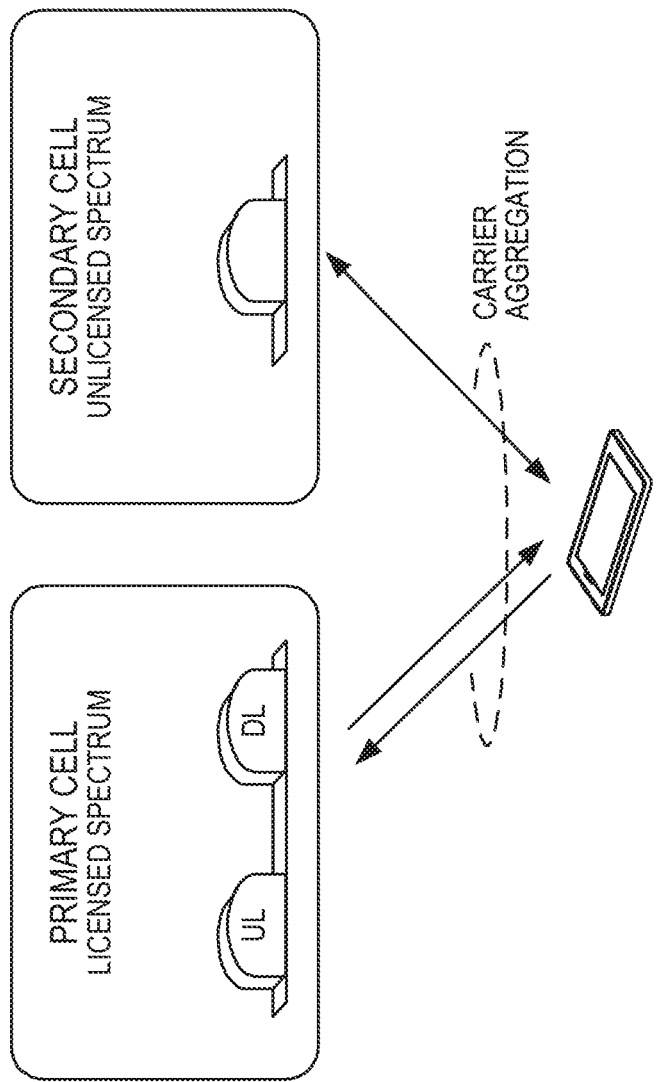
FIG. 6 illustrates License Assisted Access (LAA) to unlicensed spectrum using LTE Carrier Aggregation (CA)
Figure 7:
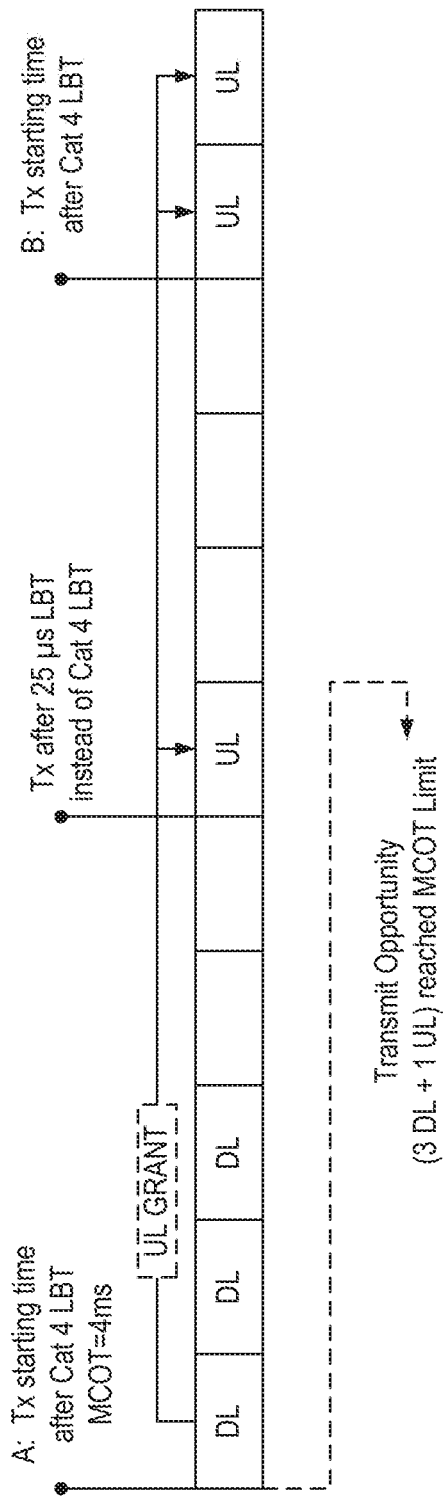
FIG. 7 illustrates sharing Maximum Channel Occupancy Time (MCOT) for LAA between an evolved or enhanced Node B (eNB) and User Equipment devices (UEs)
Figure 8:
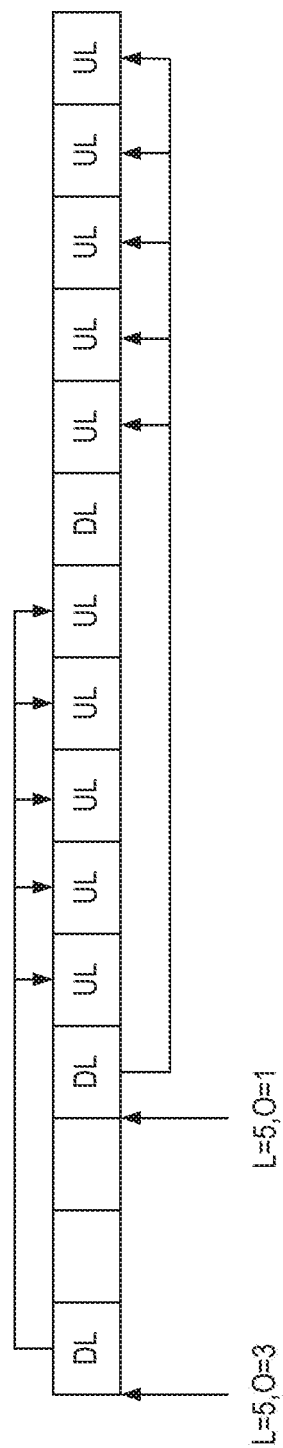
FIG. 8 illustrates an example of scheduled UL access.

FIG. 8 shows an example in which the eNB sends a first multi-subframe UL grant corresponding to the subframes n+4/5/6/7/8 and a second grant corresponding to m+7/8/9/10/11. Hardware limitations impose a minimum processing delay (δ=4 milliseconds (ms)) for the UL grant, i.e. the time for the UE to receive the grant, process the grant, and encode the UL packet to be transmitted. Given this constraint, the grant refers to an UL transmission duration of 1 ms that occurs $G_d$ later, where $G_d \geq \delta$.

The eNB indicates to the UE which UL subframes belong to the same channel occupancy by sending, via Common Physical Downlink Control Channel (C-PDCCH), the length of the UL burst (L) and the offset (O) of the UL burst. The Listen-Before-Talk (LBT) procedure for any UL subframe from the subframe in which C-PDCCH was received up to and including all subframes until the end of the signaled UL burst duration, for which the eNB had already indicated to perform Cat. 4 LBT, is switched to UL LBT Type 2 or an LBT based on 25 μs Clear Channel Assessment (CCA). Therefore, in the example of FIG. 8, the UE can transmit using 25 μs LBT on any of the UL scheduled subframes.

Figure 9:
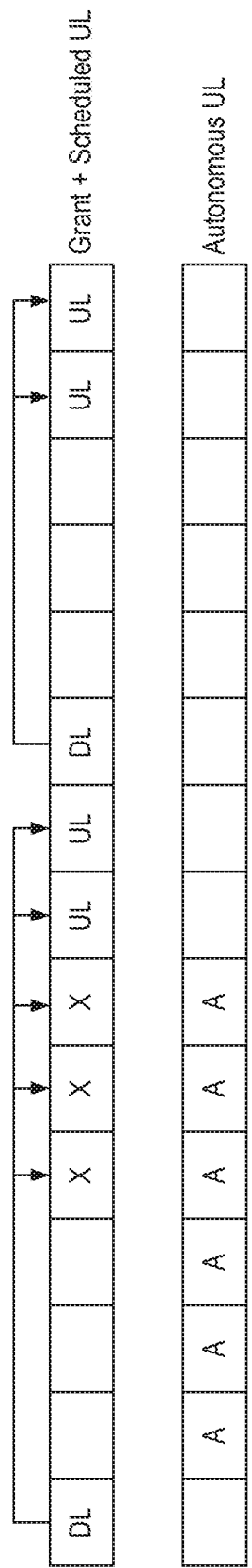
FIG. 9 illustrates an example of the impact of Autonomous UL (AUL) on scheduled UL access.

With the support of Autonomous UL (AUL), there is a risk that AUL can grab the channel within the gap between the grant transmission and the corresponding UL burst. Depending on the AUL Channel Occupancy Time (COT) duration, the autonomous transmission can continue to transmit on the subframes that are scheduled for another UE and thereby block the scheduled transmission, as illustrated in the example of FIG. 9 where "X" denotes scheduled UL transmissions that were blocked by the autonomous UL transmission. Besides, if the AUL transmission blocks the transmission of the second grant, the interweaving between UL grant and UL transmission is also lost.

Systems and methods are disclosed herein that relate to restricting the behavior of AUL UEs when coexisting with scheduled UL UEs in the same cell.

Embodiments of the present disclosure ensure that AUL UEs do not harm the performance of coexisting scheduled UEs. For instance, embodiments disclosed herein prioritize scheduled UL UEs when both scheduled UL and AUL UEs coexist in same cell. Embodiments disclosed herein also maintain good scheduled UL performance.

Figure 10:
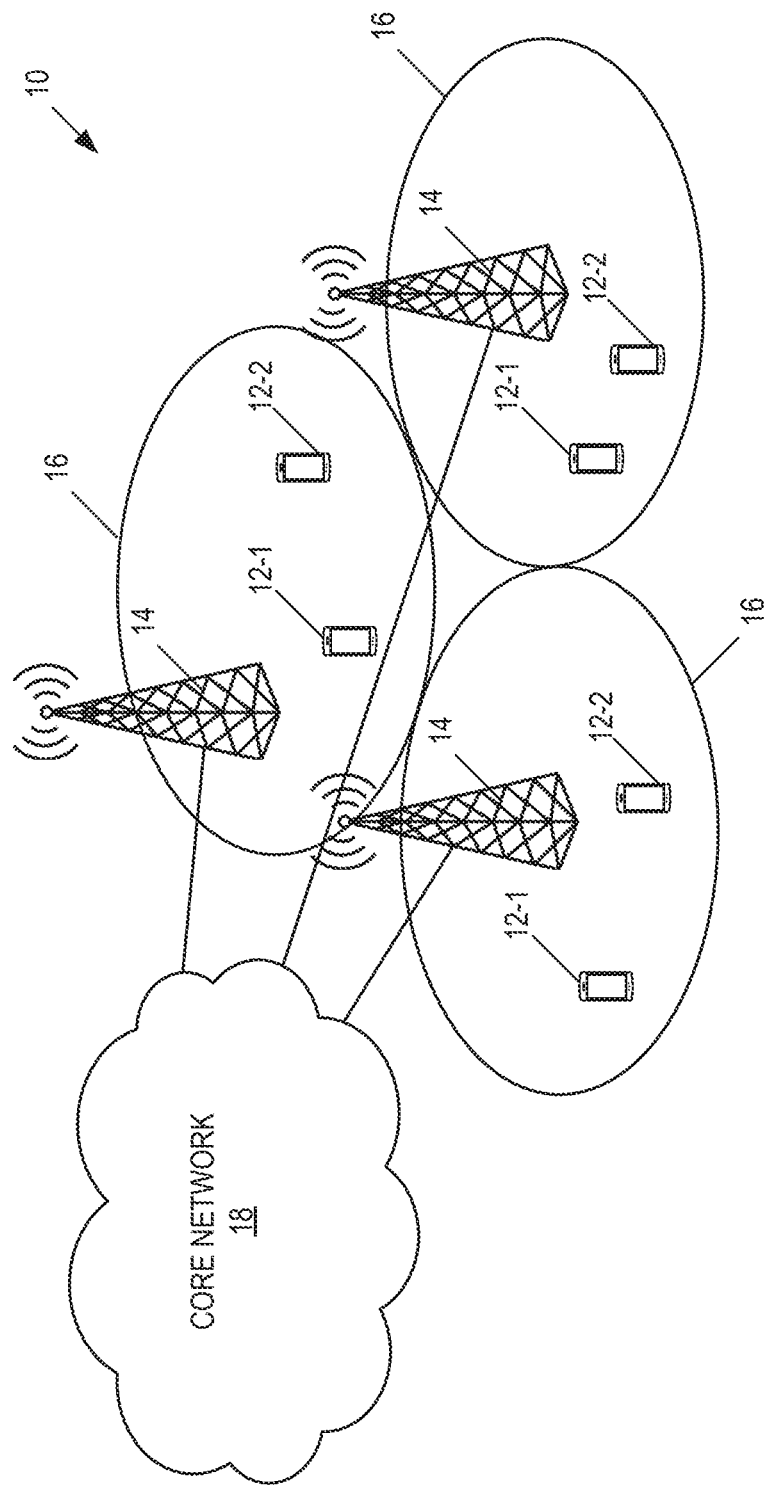
FIG. 10 illustrates one example of a wireless communication system in which embodiments of the present disclosure may be implemented.

In this regard, FIG. 10 illustrates one example of a wireless communication system 10 in which embodiments of the present disclosure may be implemented. In some embodiments, the wireless communication system 10 is a 3GPP LTE License Assisted Access (LAA) network or a 3GPP MulteFire network. However, the present disclosure is also applicable to other types of wireless communication systems that operate in the unlicensed spectrum or otherwise require LBT.

As illustrated, the wireless communication system 10 includes a number of wireless devices 12. Note that wireless devices 12 that perform scheduled UL transmissions are references as "scheduled" wireless devices 12-1, and wireless devices 12 that perform autonomous UL transmissions are referred to as AUL wireless devices 12-2. Also note that a particular wireless device 12 may operate as both a scheduled wireless device 12-1 and AUL wireless device 12-2, e.g., at different times within the same cell. A number of radio access nodes 14 (e.g., eNBs) having corresponding coverage areas or cells 16 provide radio access to the wireless devices 12. The radio access nodes 14 are connected to a core network 18, as will be appreciated by one of skill in the art. In the example embodiments disclosed herein, the cells 16 are LAA cells (or MulteFire cells) that require LBT.

In some embodiments, an AUL wireless device 12-2 monitors a physical control channel (i.e., a C-PDCCH in the case of LAA) transmitted by the radio access node 14 (i.e., eNB in the case of LAA) where the radio access node 14 indicates to the wireless devices 12 which UL subframes belong to the same channel occupancy (i.e., which UL subframes belong to the same channel occupancy that might be scheduled for uplink for other wireless devices). This information is used by the AUL wireless device 12-2 to restrict autonomous UL transmission by the AUL wireless device 12-2. Several embodiments are described below.

In a first embodiment, an AUL wireless device 12-2 receives a C-PDCCH from the radio access node 14 that includes an indication of a (scheduled) UL burst duration. The AUL wireless device 12-2 avoids performing autonomous UL transmissions during any subframe from the subframe in which the C-PDCCH was received up to and including all subframes until the end of the signaled UL burst duration.

In a second embodiment, an AUL wireless device 12-2 receives a C-PDCCH from the radio access node 14 in subframe n, where the C-PDCCH includes an indication of a (scheduled) UL burst duration. The AUL wireless device 12-2 avoids performing autonomous UL transmissions during any subframe from subframe n+Offset−X until the end of the signaled UL burst duration. "Offset" is a value signaled in the C-PDCCH to signal the start of the UL burst, and:

X is a fixed value. For example, X=2, the Autonomous UL terminates its transmission 2 subframes before the start of the signaled UL burst.

X can be indicated on the same subframe in which CPDCCH is received

X can be higher layer configured (e.g., Radio Resource Control (RRC) configured).

In a third embodiment, an AUL wireless device 12-2 receives a C-PDCCH from the radio access node 14 in subframe n, where the C-PDCCH includes an indication of a (scheduled) UL burst duration. The AUL wireless device 12-2 is allowed to perform autonomous UL transmissions during any subframe from the subframe in which C-PDCCH was received up to and including all subframes until the end of the signaled UL burst duration if:
  AUL transmission is limited to single subframe transmissions, i.e. COT: 1 ms
  with last symbol vacated to create LBT gap.

In some embodiments, the third embodiment is combined with the second embodiments such that the AUL wireless device 12-2 generally avoids performing autonomous UL transmissions during any subframe from subframe n+Offset–X until the end of the signaled UL burst duration as described above for embodiment two unless the criteria above are satisfied.

In a fourth embodiment, the radio access node 14 (e.g., eNB) indicates via new signaling if the AUL wireless device 12-2 is allowed to perform autonomous UL transmissions during any or subset of the subframe from the subframe in which C-PDCCH was received up to and including all subframes until the end of the signaled UL burst duration. This indication can be via higher layer signaling (e.g., RRC) or via dedicated or common signaling on Physical Downlink Control Channel (PDCCH). As non-limiting examples, the indication can be composed of:
  1 bit indicating if AUL transmission is allowed during any or subset of the subframe from the subframe in which C-PDCCH was received up to and including all subframes until the end of the signaled UL burst duration.
  The radio access node 14 indicates the autonomous UL burst duration in which the AUL wireless device 12-2 is allowed to perform autonomous UL transmissions during any subframe from the subframe in which C-PDCCH was received up the end of the signaled autonomous UL burst duration. For example, if at subframe n the radio access node indicates an autonomous UL burst having a burst duration of 3 subframes, the AUL wireless device 12-2 is allowed to perform autonomous UL transmission during any subframe from the subframe in which C-PDCCH is received up to n+3. The AUL wireless device 12-2 then avoids AUL transmission from n+4 until the end of the signaled UL burst duration.

The embodiments disclosed herein control the behavior of the AUL wireless device 12-2 when coexisting with scheduled wireless devices 12-1 in the same cell.

Figure 11:
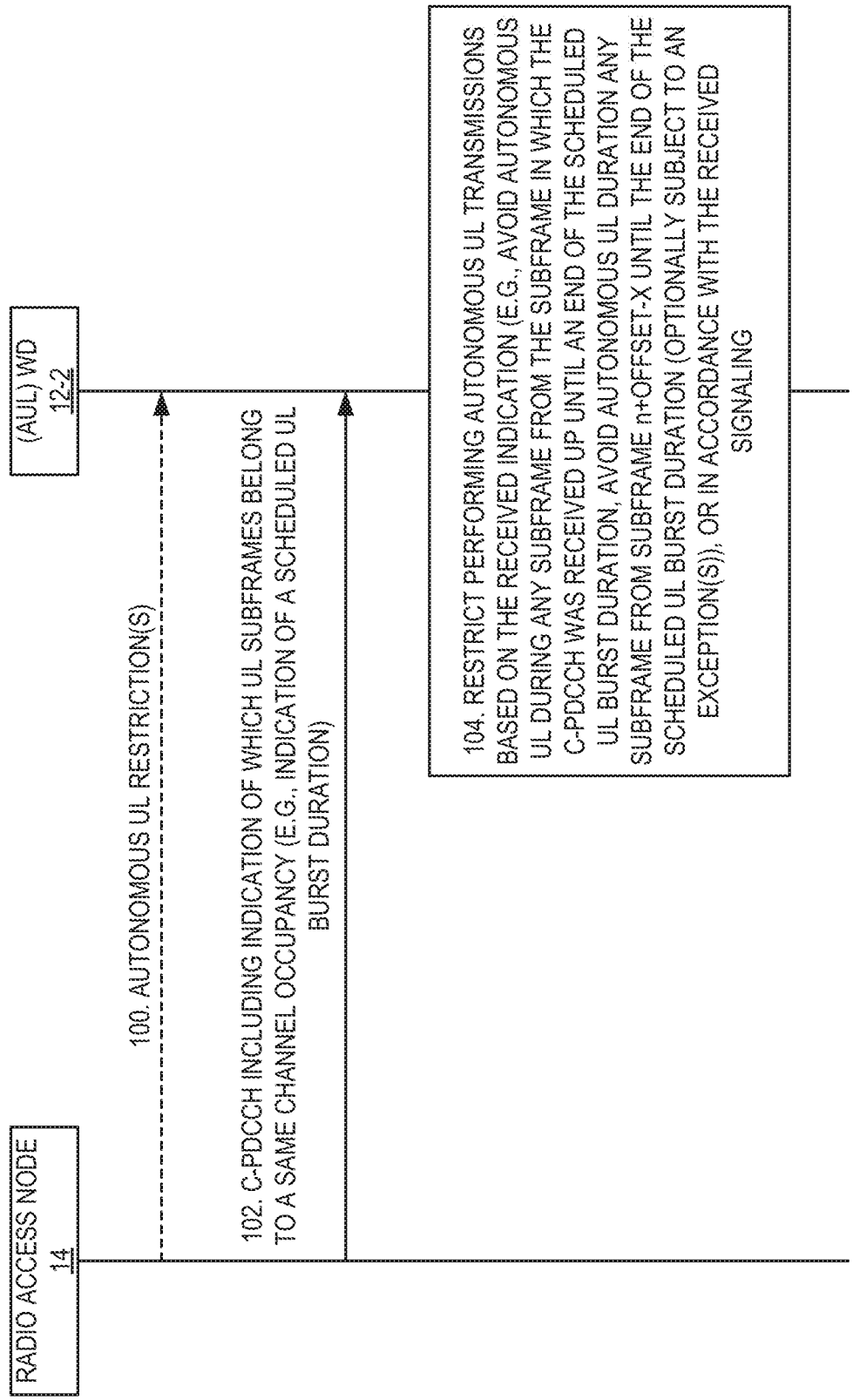
FIG. 11 illustrates the operation of a radio access node and a wireless device to restrict autonomous UL transmissions so as to enable coexistence of the wireless device and a scheduled wireless device(s) in the same cell in accordance with at least some embodiments of the present disclosure.

FIG. 11 illustrates the operation of a radio access node 14 and an AUL wireless device 12-2 in accordance with at least some of the embodiments disclosed herein. Optional steps are represented by dashed lines. As illustrated, optionally (i.e., in some embodiments), the radio access node 14 signals an AUL restriction(s) to the AUL wireless device 12-2, as discussed above with respect to embodiment four (step 100). The radio access node 14 transmits a C-PDCCH that includes an indication of which UL subframes belong to a same channel occupancy (step 102). More specifically, the C-PDCCH includes an indication of a UL burst duration and an offset, as described above. The scheduled uplink subframes are the subframes that start after the offset and for the UL burst duration indicated by the C-PDCCH. The AUL wireless device 12-2 restricts performing autonomous UL transmissions based on the received indication and, option-ally, the AUL restriction(s) received in step 100, if any (step 104). As described above, in some embodiments, the AUL wireless device 12-2 avoids performing autonomous UL transmission during any subframe from the subframe in which the C-PDCCH was received until the end of the UL burst duration. In some other embodiments, given that the C-PDCCH was received in subframe n, the AUL wireless device 12-2 avoids performing autonomous UL transmission during any subframe from subframe n+Offset–X until the end of the UL burst duration. In some other embodiments, the AUL wireless device 12-2 is allowed to perform autonomous UL transmissions during any subframe from the subframe in which the C-PDCCH was received up to and including all subframes until the end of the signaled UL burst duration if: AUL transmission is limited to single subframe transmissions, i.e. COT: 1 ms, and the AUL transmission leaves the last symbol vacated to create an LBT gap. In some other embodiments, the AUL wireless device 12-2 restricts performing autonomous UL transmissions in accordance with the AUL restriction(s) received in step 100.

Figure 12:
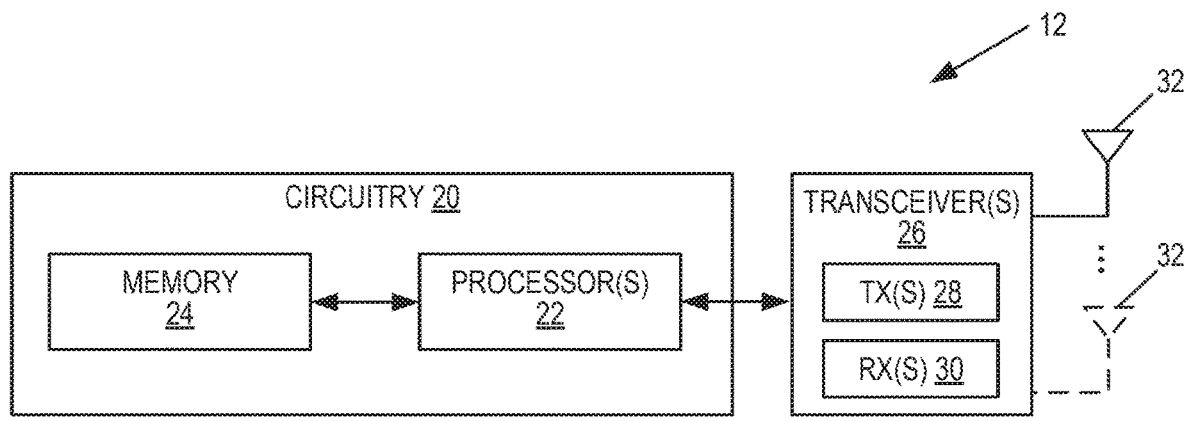
FIGS. 12 and 13 illustrate example embodiments of a wireless device.

FIG. 12 is a schematic block diagram of the wireless device 12, or UE 12, according to some embodiments of the present disclosure. As illustrated, the wireless device 12 includes circuitry 20 comprising one or more processors 22 (e.g., Central Processing Units (CPUs), Application Specific Integrated Circuits (ASICs), Field Programmable Gate Arrays (FPGAs), Digital Signal Processors (DSPs), and/or the like) and memory 24. The wireless device 12 also includes one or more transceivers 26 each including one or more transmitters 28 and one or more receivers 30 coupled to one or more antennas 32. In some embodiments, the functionality of the wireless device 12 described herein may be implemented in hardware (e.g., via hardware within the circuitry 20 and/or within the processor(s) 22) or be implemented in a combination of hardware and software (e.g., fully or partially implemented in software that is, e.g., stored in the memory 24 and executed by the processor(s) 22).

In some embodiments, a computer program including instructions which, when executed by the at least one processor 22, causes the at least one processor 22 to carry out at least some of the functionality of the wireless device 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 13:
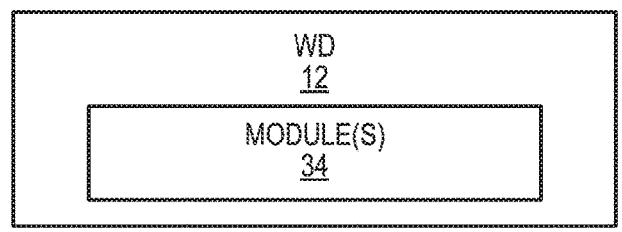

FIG. 13 is a schematic block diagram of the wireless device 12, or UE, according to some other embodiments of the present disclosure. The wireless device 12 includes one or more modules 34, each of which is implemented in software. The module(s) 34 provide the functionality of the wireless device 12 described herein (e.g., as described with respect to FIG. 11).

Figure 14:
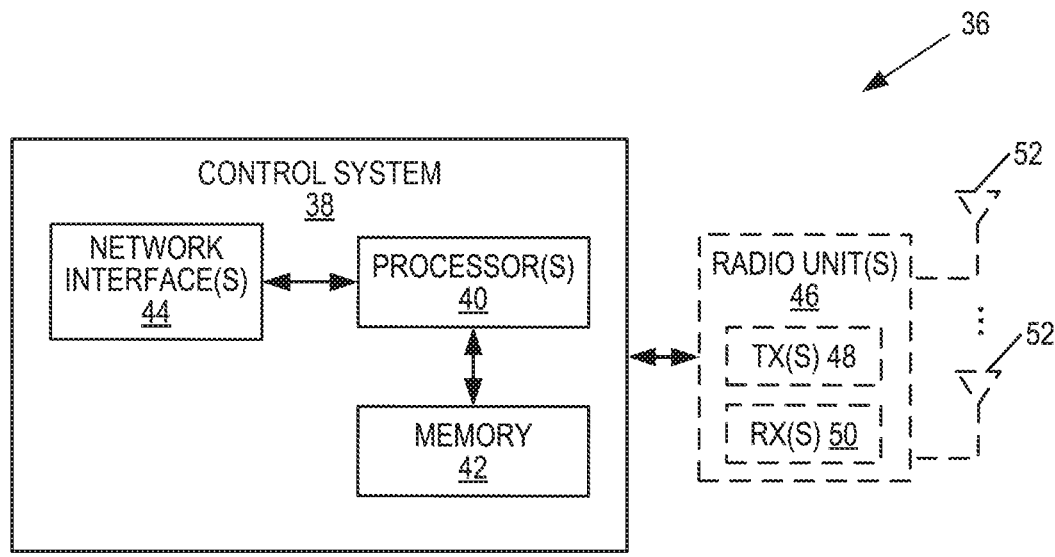
FIGS. 14 through 16 illustrate example embodiments of a radio access node.

FIG. 14 is a schematic block diagram of a network node 36 (e.g., a radio access node 14 such as, for example, an eNB) according to some embodiments of the present disclosure. As illustrated, the network node 36 includes a control system 38 that includes circuitry comprising one or more processors 40 (e.g., CPUs, ASICs, DSPs, FPGAs, and/or the like) and memory 42. The control system 38 also includes a network interface 44. In embodiments in which the network node 36 is a radio access node 14, the network node 36 also includes one or more radio units 46 that each include one or more transmitters 48 and one or more receivers 50 coupled to one or more antennas 52. In some embodiments, the functionality of the network node 36 described above may be fully or partially implemented in software that is, e.g., stored in the memory 42 and executed by the processor(s) 40.

Figure 15:
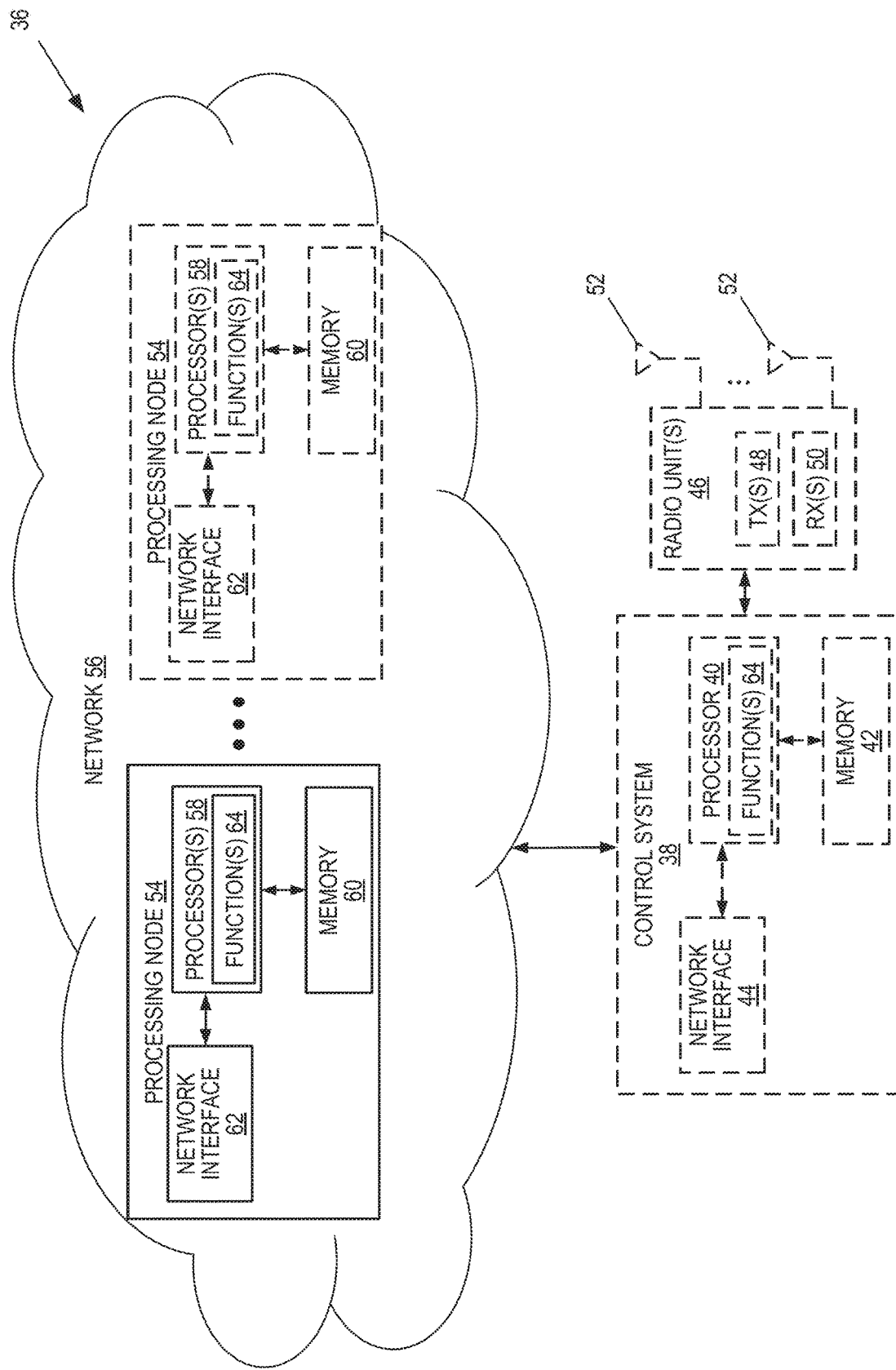

FIG. 15 is a schematic block diagram that illustrates a virtualized embodiment of the network node 36 (e.g., the radio access node 14) according to some embodiments of the present disclosure. As used herein, a "virtualized" network node 36 is a network node 36 in which at least a portion of the functionality of the network node 36 is implemented as a virtual component (e.g., via a virtual machine(s) executing on a physical processing node(s) in a network(s)). As illustrated, the network node 36 optionally includes the control system 38, as described with respect to FIG. 14. In addition, if the network node 36 is the radio access node 14, the network node 36 also includes the one or more radio units 46, as described with respect to FIG. 14. The control system 38 (if present) is connected to one or more processing nodes 54 coupled to or included as part of a network(s) 56 via the network interface 44. Alternatively, if the control system 38 is not present, the one or more radio units 46 (if present) are connected to the one or more processing nodes 54 via a network interface(s). Alternatively, all of the functionality of the network node 36 described herein may be implemented in the processing nodes 54. Each processing node 54 includes one or more processors 58 (e.g., CPUs, ASICs, DSPs, FPGAs, and/or the like), memory 60, and a network interface 62.

In this example, functions 64 of the network node 36 (e.g., the functions of the radio access node 14 described above with respect to, e.g., FIG. 11) described herein are implemented at the one or more processing nodes 54 or distributed across the control system 38 (if present) and the one or more processing nodes 54 in any desired manner. In some particular embodiments, some or all of the functions 64 of the network node 36 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the control system 38 (if present) or alternatively the radio unit(s) 46 (if present) is used in order to carry out at least some of the desired functions 64. Notably, in some embodiments, the control system 38 may not be included, in which case the radio unit(s) 46 (if present) communicates directly with the processing node(s) 54 via an appropriate network interface(s).

In some particular embodiments, higher layer functionality (e.g., layer 3 and up and possibly some of layer 2 of the protocol stack) of the network node 36 may be implemented at the processing node(s) 54 as virtual components (i.e., implemented "in the cloud") whereas lower layer functionality (e.g., layer 1 and possibly some of layer 2 of the protocol stack) may be implemented in the radio unit(s) 46 and possibly the control system 38.

In some embodiments, a computer program including instructions which, when executed by the at least one processor 40, 58, causes the at least one processor 40, 58 to carry out the functionality of the network node 36 or a processing node 54 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 42, 60).

Figure 16:
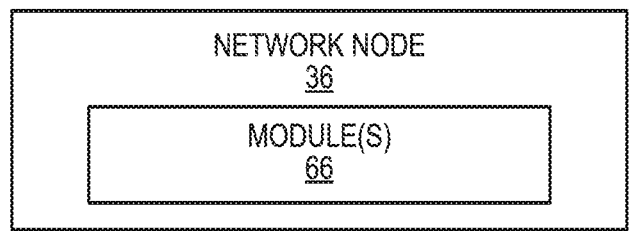

FIG. 16 is a schematic block diagram of the network node 36 according to some other embodiments of the present disclosure. The network node 36 includes one or more modules 66, each of which is implemented in software. The module(s) 66 provide the functionality of the network node 36 described herein (e.g., the functionality of the radio access node 14 described in relation to, e.g., FIG. 11).

EXAMPLE EMBODIMENTS

While not being limited thereto, some example embodiments of the present disclosure are provided below.

Embodiment 1: A method of operation of a wireless device (12) in a wireless communication system (10), comprising: receiving (102), from a radio access node (14), an indication of which subframes belong to a same channel occupancy within a cell that requires Listen-Before-Talk, LBT; and restricting (104) performance of autonomous uplink transmissions by the wireless device (12) based on the indication of which subframes belong to the same channel occupancy.

Embodiment 2: The method of embodiment 1 wherein restricting (104) the performance of autonomous uplink transmissions by the wireless device (12) comprises avoiding autonomous uplink transmissions by the wireless device (12) from a subframe in which the indication was received up until an end of the channel occupancy.

Embodiment 3: The method of embodiment 1 wherein: receiving (102) the indication comprises receiving (102) a Common Physical Downlink Control Channel, C-PDCCH, that comprises the indication, wherein the indication is an indication of an uplink burst duration; and restricting (104) the performance of autonomous uplink transmissions by the wireless device (12) comprises avoiding autonomous uplink transmissions by the wireless device (12) from a subframe in which the C-PDCCH was received up until an end of the uplink burst duration.

Embodiment 4: The method of embodiment 1 wherein: receiving (102) the indication comprises receiving (102) the indication in a subframe n and an indication of an offset of a start of the channel occupancy from the subframe n; and restricting (104) the performance of autonomous uplink transmissions by the wireless device (12) comprises avoiding autonomous uplink transmissions by the wireless device (12) from a subframe n+Offset−X up until an end of the channel occupancy, wherein "Offset" is the offset of the start of the channel occupancy from the subframe n and "X" is predefined or preconfigured value that is less than or equal to the offset.

Embodiment 5: The method of embodiment 1 wherein: receiving (102) the indication comprises receiving (102), in a subframe n, a Common Physical Downlink Control Channel, C-PDCCH, that comprises the indication, wherein the indication is an indication of an uplink burst duration, and an indication of an offset of a start of the uplink burst duration from the subframe n; and restricting (104) the performance of autonomous uplink transmissions by the wireless device (12) comprises avoiding autonomous uplink transmissions by the wireless device (12) from a subframe n+Offset−X up until an end of the uplink burst duration, wherein "Offset" is the offset of the start of the uplink burst duration from the subframe n and "X" is predefined or preconfigured value that is less than or equal to the offset.

Embodiment 6: The method of embodiment 1 wherein: restricting (104) the performance of autonomous uplink transmissions by the wireless device (12) comprises allowing autonomous uplink transmissions by the wireless device

(12) in any subframe from a subframe in which the indication was received up until an end of the channel occupancy if: the autonomous uplink transmission is limited to single subframe transmissions and the autonomous uplink transmission leaves a last symbol of the autonomous uplink transmission vacated.

Embodiment 7: The method of embodiment 1 wherein: receiving (102) the indication comprises receiving (102), in a subframe n, a Common Physical Downlink Control Channel, C-PDCCH, that comprises the indication, wherein the indication is an indication of an uplink burst duration; and restricting (104) the performance of autonomous uplink transmissions by the wireless device (12) comprises allowing autonomous uplink transmissions by the wireless device (12) in any subframe from the subframe n in which the C-PDCCH was received up until an end of the uplink burst duration if: the autonomous uplink transmission is limited to single subframe transmissions and the autonomous uplink transmission leaves a last symbol of the autonomous uplink transmission vacated.

Embodiment 8: The method of embodiment 1 further comprising: receiving (100) one or more autonomous uplink restrictions from the radio access node (14); wherein restricting (104) the performance of autonomous uplink transmissions by the wireless device (12) comprises restricting (104) the performance of autonomous uplink transmissions by the wireless device (12) in accordance with the one or more autonomous uplink restrictions.

Embodiment 9: A wireless device (12) for a wireless communication system (10), the wireless device (12) adapted to perform the method of any one of embodiments 1 to 8.

Embodiment 10: A wireless device (12) for a wireless communication system (10), comprising: one or more transceivers (26); and circuitry (20) operable to perform the method of any one of embodiments 1 to 8.

Embodiment 11: A wireless device (12) for a wireless communication system (10), comprising: one or more modules (34) operable to perform the method of any one of embodiments 1 to 8.

The following acronyms are used throughout this disclosure.
- 3GPP Third Generation Partnership Project
- 5G Fifth Generation
- ACK Acknowledgement
- ASIC Application Specific Integrated Circuit
- AUL Autonomous Uplink
- BSR Buffer Status Report
- CA Carrier Aggregation
- CCA Clear Channel Assessment
- CE Control Element
- CFI Control Format Indicator
- COT Channel Occupancy Time
- C-PDCCH Common Physical Downlink Control Channel
- CPU Central Processing Unit
- CRC Cyclic Redundancy Check
- C-RNTI Cell Radio Network Temporary Identifier
- CRS Cell Specific Reference Symbol
- CSMA/CA Carrier Sense Multiple Access with Collision Avoidance
- CW Contention Window
- DCI Downlink Control Information
- DFT Discrete Fourier Transform
- DIFS Distributed Inter-Frame Space
- DL Downlink
- DMRS Demodulation Reference Signal
- DSP Digital Signal Processors
- eNB Evolved or Enhanced Node B
- EPDCCH Enhanced Physical Downlink Control Channel
- FDMA Frequency Division Multiple Access
- FPGA Field Programmable Gate Array
- GHz Gigahertz
- gNB New Radio Base Station
- LAA License Assisted Access
- LBT Listen-Before-Talk
- LTE Long Term Evolution
- MAC Medium Access Control
- MCOT Maximum Channel Occupancy Time
- MME Mobility Management Entity
- ms Millisecond
- MTC Machine Type Communication
- NR New Radio
- OFDM Orthogonal Frequency Division Multiplexing
- PCell Primary Cell
- PDCCH Physical Downlink Control Channel
- P-GW Packet Data Network Gateway
- PUCCH Physical Uplink Control Channel
- PUSCH Physical Uplink Shared Channel
- Rel Release
- RRC Radio Resource Control
- SCell Secondary Cell
- SCEF Service Capability Exposure Function
- SC-FDMA Single Carrier Frequency Division Multiple Access
- SR Scheduling Request
- SRS Sounding Reference Signal
- TDMA Time Division Multiple Access
- TS Technical Specification
- UE User Equipment
- UL Uplink
- WLAN Wireless Local Area Network
- μs Microsecond Those skilled in the art will recognize improvements and modifications to the embodiments of the present disclosure. All such improvements and modifications are considered within the scope of the concepts disclosed herein.

What is claimed is:

1. A method of operation of a wireless device in a wireless communication system, comprising:
   receiving, from a radio access node, an indication of subframes that belong to a scheduled uplink burst within a cell that requires Listen-Before-Talk, LBT; and
   restricting performance of autonomous uplink transmissions by the wireless device based on the indication of subframes that belong to the scheduled uplink burst.

2. The method of claim 1 further comprising:
   receiving, from the radio access node, an indication of whether the wireless device is allowed to perform autonomous uplink transmissions during any of the subframes that belong to the scheduled uplink burst or during a subset of the subframes that belong to the scheduled uplink burst;
   wherein restricting performance of autonomous uplink transmissions comprises restricting performance of autonomous uplink transmissions by the wireless device based on the indication of subframes that belong to the scheduled uplink burst and the of whether the wireless device is allowed to perform autonomous uplink transmissions during any of the subframes that belong to the scheduled uplink burst or a subset of the subframes that belong to the scheduled uplink burst.

3. The method of claim 1 wherein:
receiving the indication comprises receiving a Common Physical Downlink Control Channel, C-PDCCH, that comprises the indication, wherein the indication comprises an indication of a scheduled uplink burst duration;
the method further comprises receiving, from the radio access node, an indication of whether the wireless device is allowed to perform autonomous uplink transmissions during any subframe or a subset of the subframes from a subframe in which the C-PDCCH was received up to and including all subframes until an end of the scheduled uplink burst duration; and
restricting the performance of autonomous uplink transmissions by the wireless device comprises avoiding autonomous uplink transmissions by the wireless device in accordance with the indication of whether the wireless device is allowed to perform autonomous uplink transmissions during any subframe or a subset of the subframes from the subframe in which the C-PDCCH was received up to and including all subframes until an end of the scheduled uplink burst duration.

4. The method of claim 3 wherein the indication of whether the wireless device is allowed to perform autonomous uplink transmissions during any subframe or a subset of the subframes from a subframe in which the C-PDCCH was received up to and including all subframes until an end of the scheduled uplink burst duration is comprised in the C-PDCCH.

5. The method of claim 3 wherein the indication of whether the wireless device is allowed to perform autonomous uplink transmissions during any subframe or a subset of the subframes from a subframe in which the C-PDCCH was received up to and including all subframes until an end of the scheduled uplink burst duration is a 1 bit indication comprised in the C-PDCCH.

6. The method of claim 1 wherein restricting the performance of autonomous uplink transmissions by the wireless device comprises avoiding autonomous uplink transmissions by the wireless device from a subframe in which the indication was received up until an end of the channel occupancy.

7. The method of claim 1 wherein:
receiving the indication comprises receiving a Common Physical Downlink Control Channel, C-PDCCH, that comprises the indication, wherein the indication comprises an indication of an uplink burst duration; and
restricting the performance of autonomous uplink transmissions by the wireless device comprises avoiding autonomous uplink transmissions by the wireless device from a subframe in which the C-PDCCH was received up until an end of the uplink burst duration.

8. The method of claim 1 wherein:
receiving the indication comprises receiving the indication in a subframe n and an indication of an offset of a start of the channel occupancy from the subframe n; and
restricting the performance of autonomous uplink transmissions by the wireless device comprises avoiding autonomous uplink transmissions by the wireless device from a subframe n+Offset−X up until an end of the channel occupancy, wherein "Offset" is the offset of the start of the channel occupancy from the subframe n and "X" is a predefined or preconfigured value that is less than or equal to the offset.

9. The method of claim 1 wherein:
receiving the indication comprises receiving, in a subframe n, a Common Physical Downlink Control Channel, C-PDCCH, that comprises:
the indication, wherein the indication is an indication of an uplink burst duration; and
an indication of an offset of a start of the uplink burst duration from the subframe n; and
restricting the performance of autonomous uplink transmissions by the wireless device comprises avoiding autonomous uplink transmissions by the wireless device from a subframe n+Offset−X up until an end of the uplink burst duration, wherein "Offset" is the offset of the start of the uplink burst duration from the subframe n and "X" is a predefined or preconfigured value that is less than or equal to the offset.

10. The method of claim 1 wherein:
restricting the performance of autonomous uplink transmissions by the wireless device comprises allowing autonomous uplink transmissions by the wireless device in any subframe from a subframe in which the indication was received up until an end of the channel occupancy if the autonomous uplink transmission is limited to single subframe transmissions and the autonomous uplink transmission leaves a last symbol of the autonomous uplink transmission vacated.

11. The method of claim 1 wherein:
receiving the indication comprises receiving, in a subframe n, a Common Physical Downlink Control Channel, C-PDCCH, that comprises the indication, wherein the indication is an indication of an uplink burst duration; and
restricting the performance of autonomous uplink transmissions by the wireless device comprises allowing autonomous uplink transmissions by the wireless device in any subframe from the subframe n in which the C-PDCCH was received up until an end of the uplink burst duration if the autonomous uplink transmission is limited to single subframe transmissions and the autonomous uplink transmission leaves a last symbol of the autonomous uplink transmission vacated.

12. The method of claim 1 further comprising:
receiving one or more autonomous uplink restrictions from the radio access node;
wherein restricting the performance of autonomous uplink transmissions by the wireless device comprises restricting the performance of autonomous uplink transmissions by the wireless device in accordance with the one or more autonomous uplink restrictions.

13. A wireless device for a wireless communication system, comprising:
one or more transceivers; and
circuitry configured such that the wireless device is operable to:
receive, from a radio access node via the one or more transceivers, an indication of subframes that belong to a scheduled uplink burst within a cell that requires Listen-Before-Talk, LBT; and
restrict performance of autonomous uplink transmissions by the wireless device based on the indication of subframes that belong to the scheduled uplink burst.

14. The wireless device of claim 13 wherein the circuitry is further configured such that the wireless device is operable to:
receive, from the radio access node, an indication of whether the wireless device is allowed to perform autonomous uplink transmissions during any of the subframes that belong to the scheduled uplink burst or during a subset of the subframes that belong to the scheduled uplink burst;

wherein restricting performance of autonomous uplink transmissions comprises restricting performance of autonomous uplink transmissions by the wireless device based on the indication of subframes that belong to the scheduled uplink burst and the of whether the wireless device is allowed to perform autonomous uplink transmissions during any of the subframes that belong to the scheduled uplink burst or a subset of the subframes that belong to the scheduled uplink burst.

15. The wireless device of claim 13 wherein the circuitry is further configured such that the wireless device is operable to:
receive the indication comprises receiving a Common Physical Downlink Control Channel, C-PDCCH, that comprises the indication, wherein the indication comprises an indication of a scheduled uplink burst duration;
receive, from the radio access node, an indication of whether the wireless device is allowed to perform autonomous uplink transmissions during any subframe or a subset of the subframes from a subframe in which the C-PDCCH was received up to and including all subframes until an end of the scheduled uplink burst duration; and
restrict the performance of autonomous uplink transmissions by the wireless device comprises avoiding autonomous uplink transmissions by the wireless device in accordance with the indication of whether the wireless device is allowed to perform autonomous uplink transmissions during any subframe or a subset of the subframes from the subframe in which the C-PDCCH was received up to and including all subframes until an end of the scheduled uplink burst duration.

16. The wireless device of claim 15 wherein the indication of whether the wireless device is allowed to perform autonomous uplink transmissions during any subframe or a subset of the subframes from a subframe in which the C-PDCCH was received up to and including all subframes until an end of the scheduled uplink burst duration is comprised in the C-PDCCH.

17. A radio access node for a wireless communication system, the radio access node comprising:
one or more processors; and
memory storing instructions executable by the one or more processors whereby the radio access node is operable to:
send, to a wireless device, an indication of subframes that belong to a scheduled uplink burst within a cell that requires Listen-Before-Talk, LBT; and
send, to the wireless device, an indication of whether the wireless device is allowed to perform autonomous uplink transmissions during any of the subframes that belong to the scheduled uplink burst or during a subset of the subframes that belong to the scheduled uplink burst.

18. The radio access node of claim 17 wherein:
sending the indication comprises sending a Common Physical Downlink Control Channel, C-PDCCH, that comprises the indication, wherein the indication comprises an indication of a scheduled uplink burst duration; and
the indication of whether the wireless device is allowed to perform autonomous uplink transmissions during any of the subframes that belong to the scheduled uplink burst or during a subset of the subframes that belong to the scheduled uplink burst is an indication of whether the wireless device is allowed to perform autonomous uplink transmissions during any subframe or a subset of the subframes from a subframe in which the C-PDCCH was received up to and including all subframes until an end of the scheduled uplink burst duration.

19. The radio access node of claim 18 wherein the indication of whether the wireless device is allowed to perform autonomous uplink transmissions during any subframe or a subset of the subframes from a subframe in which the C-PDCCH was received up to and including all subframes until an end of the scheduled uplink burst duration is included in the C-PDCCH.

20. The radio access node of claim 18 wherein the indication of whether the wireless device is allowed to perform autonomous uplink transmissions during any subframe or a subset of the subframes from a subframe in which the C-PDCCH was received up to and including all subframes until an end of the scheduled uplink burst duration is a 1 bit indication included in the C-PDCCH.

* * * * *